United States Patent
Toyama

(10) Patent No.: US 11,117,553 B2
(45) Date of Patent: Sep. 14, 2021

(54) VEHICLE CLEANING SYSTEM

(71) Applicant: DENSO CORPORATION, Kariya (JP)

(72) Inventor: Ryo Toyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 230 days.

(21) Appl. No.: 16/393,390

(22) Filed: Apr. 24, 2019

(65) Prior Publication Data

US 2019/0344758 A1 Nov. 14, 2019

(30) Foreign Application Priority Data

May 8, 2018 (JP) .............................. JP2018-089940

(51) Int. Cl.
*B60S 1/52* (2006.01)
*B60S 1/46* (2006.01)
*B60S 1/48* (2006.01)
*B60S 1/08* (2006.01)
*B60S 1/24* (2006.01)

(52) U.S. Cl.
CPC ................ *B60S 1/482* (2013.01); *B60S 1/08* (2013.01); *B60S 1/46* (2013.01); *B60S 1/52* (2013.01); *B60S 1/24* (2013.01)

(58) Field of Classification Search
CPC ...... B60S 1/46; B60S 1/52; B60S 1/24; B60S 1/08
See application file for complete search history.

(56) References Cited

U.S. PATENT DOCUMENTS

| | | | |
|---|---|---|---|
| 6,438,789 B1* | 8/2002 | Murawa | B60S 1/38 15/250.01 |
| 6,518,717 B1 | 2/2003 | Michenfelder et al. | |
| 7,764,034 B2* | 7/2010 | Willey | B60S 1/08 318/443 |
| 2015/0353058 A1* | 12/2015 | Ernst | B60S 1/0866 134/18 |
| 2016/0129888 A1* | 5/2016 | Kim | B60S 1/08 15/250.04 |
| 2017/0225659 A1* | 8/2017 | Kobori | B60S 1/524 |
| 2018/0170319 A1* | 6/2018 | Schmidt | B60S 1/0818 |

FOREIGN PATENT DOCUMENTS

JP 4861884 B2 1/2012
JP 6232301 B2 11/2017

* cited by examiner

*Primary Examiner* — Michael D Jennings
(74) *Attorney, Agent, or Firm* — Oliff PLC

(57) ABSTRACT

A vehicle cleaning system includes a wiper motor, a vehicle wiper, a washer nozzle, a washer pump, and a controller. The wiper motor forwardly and reversely rotates an output shaft. The vehicle wiper is coupled to the output shaft and reciprocally wipes a surface for wiping in accordance with forward and reverse rotations of the output shaft. The washer nozzle is arranged on the vehicle wiper. The washer pump feeds a washer fluid to the washer nozzle. The controller controls the wiper motor and the washer pump. The controller drives the washer pump so that the washer fluid is ejected in a direction in which accumulated snow is present based on a determination that the vehicle wiper is in a constrained state caused by accumulated snow.

9 Claims, 6 Drawing Sheets

VEHICLE CLEANING SYSTEM

BACKGROUND

1. Field

The present disclosure relates to a vehicle cleaning system.

2. Description of Related Art

A vehicle cleaning system installed in a vehicle such as an automobile may include a wiper motor that forwardly and reversely rotates an output shaft, a vehicle wiper that is coupled to the output shaft and reciprocally wipes a surface for wiping such as a windshield in accordance with the forward and reverse rotations of the output shaft, and a controller that drives the vehicle wiper in the opposite direction based on a detection of a constrained state of the vehicle wiper (for example, refer to Japanese Patent No. 4861884). In such a vehicle cleaning system, even when the vehicle wiper contacts, for example, accumulated snow, and enters a constrained state in which the vehicle wiper cannot perform a wiping operation beyond the position, the vehicle wiper is driven in the opposite direction. This prevents a high current from continuously flowing in the wiper motor and allows the wiping of the surface in the unconstrained range.

However, in a vehicle cleaning system such as that described above, when the vehicle wiper is in the constrained state caused by accumulated snow, the accumulated snow is not removed. Thus, for example, the driver needs to go outside the passenger compartment and remove the accumulated snow. Such a task is bothersome.

SUMMARY

It is an object of the present disclosure to provide a vehicle cleaning system that efficiently removes accumulated snow.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To achieve the above object, an aspect of the present disclosure is a vehicle cleaning system that includes a wiper motor, a vehicle wiper, a washer nozzle, a washer pump, and a controller. The wiper motor forwardly and reversely rotates an output shaft. The vehicle wiper is coupled to the output shaft and reciprocally wipes a surface for wiping in accordance with forward and reverse rotations of the output shaft. The washer nozzle is arranged on the vehicle wiper. The washer pump feeds a washer fluid to the washer nozzle. The controller controls the wiper motor and the washer pump. The controller drives the washer pump so that the washer fluid is ejected in a direction in which accumulated snow is present based on a determination that the vehicle wiper is in a constrained state caused by accumulated snow.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a vehicle cleaning system 100 will now be described with reference to FIGS. 1 to 3.

Figure 1:
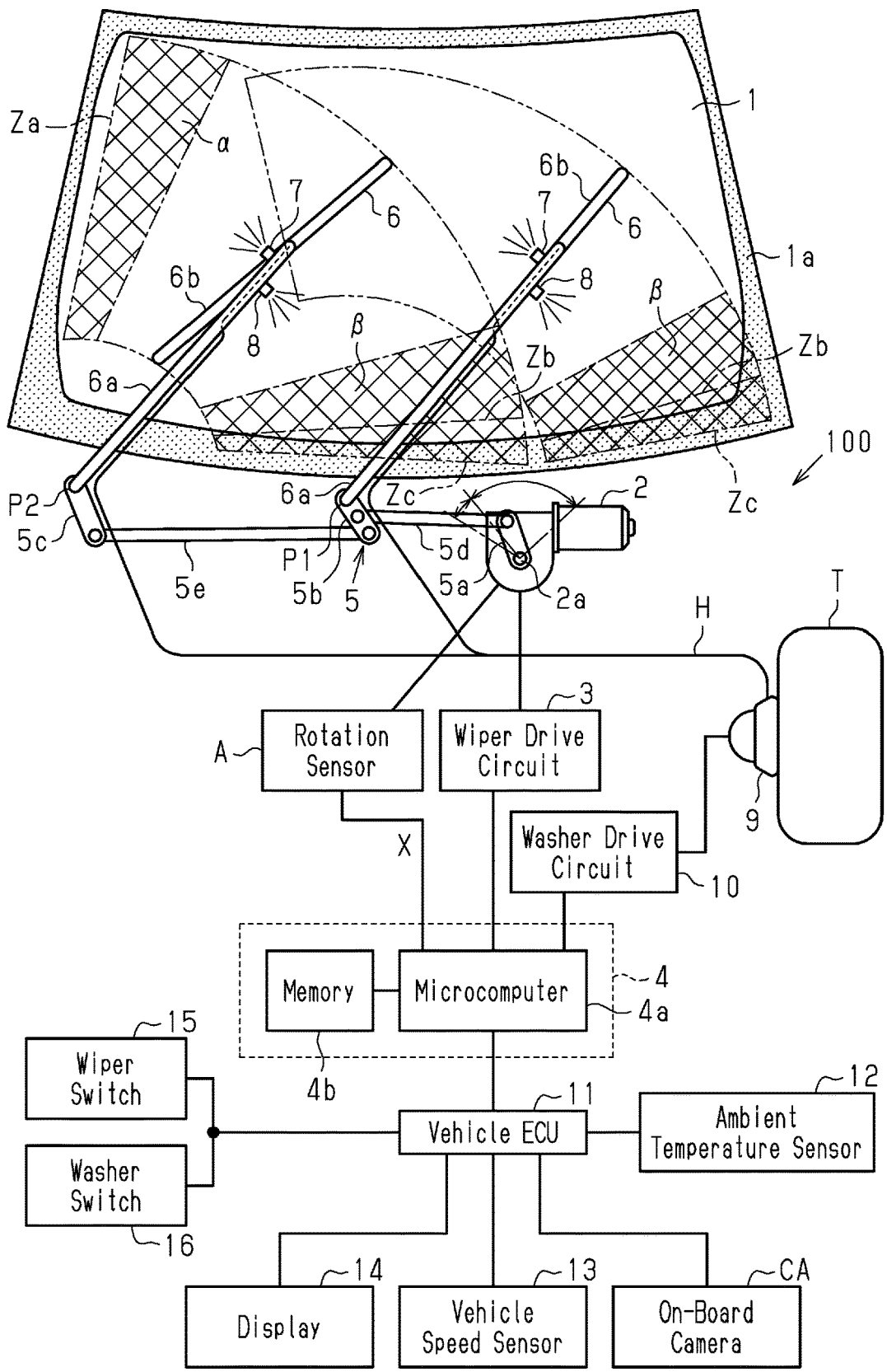
FIG. 1 is a schematic diagram of a vehicle according to a first embodiment of a vehicle cleaning system.

As shown in FIG. 1, a wiper motor 2 is fixed to a lower side (ground side) of a front window 1, which corresponds to a surface of a vehicle for wiping, and configures part of the vehicle cleaning system 100. The front window 1 has a black edge defining a black ceramic area 1a (shaded portion in FIG. 1). The wiper motor 2 is electrically connected to a controller 4 via a wiper drive circuit 3. The controller 4 controls forward and reverse rotations of an output shaft 2a. The output shaft 2a has a basal portion to which a sensor magnet (not shown) is attached to rotate in cooperation with the output shaft 2a. The wiper motor 2 further includes a rotation sensor A that detects, for example, a rotation speed and a rotational angle of the output shaft 2a. The rotation sensor A transmits a rotation information signal X, which is obtained by converting the magnetic field (magnetic force) of the sensor magnet into current, to the controller 4 (more specifically, microcomputer 4a described below). For the sake of illustration, FIG. 1 shows the rotation sensor A outside the wiper motor 2. However, the actual rotation sensor A is arranged in the wiper motor 2. The wiper drive circuit 3, which is described above, and a washer drive circuit 10 and the controller 4 (microcomputer 4a and memory 4b described below), which will be described below, may be integrated as a control substrate and arranged in the wiper motor 2.

The output shaft 2a of the wiper motor 2 is drivingly coupled to two vehicle wipers 6 via a link mechanism 5. The link mechanism 5 includes a crank arm 5a, first and second pivot levers 5b and 5c, and first and second link rods 5d and 5e. The crank arm 5a has a first end fixed to the distal end of the output shaft 2a. The first link rod 5d has a first end pivotally coupled to a second end of the crank arm 5a. The first link rod 5d has a second end pivotally coupled to an intermediate portion of the first pivot lever 5b. The second link rod 5e has a first end pivotally coupled to a first end of the first pivot lever 5b. The second link rod 5e has a second end coupled to a first end of the second pivot lever 5c. The first and second pivot levers 5b and 5c each have a second end fixed to a basal portion of the corresponding one of first and second pivot shafts P1 and P2. The vehicle wipers 6 each include a wiper arm 6a, the basal portion of which is fastened to the distal end of the corresponding one of the first and second pivot shafts P1 and P2, and a wiper blade 6b coupled to the distal portion of the wiper arm 6a. The vehicle wipers 6 perform reciprocal wiping between a lower reversal position Zb (or rest position Zc) and an upper reversal position Za of the front window 1 (its outer surface) in accordance with forward and reverse rotations of the output shaft 2a. Movement (direction) of the wiper blades 6b from the lower reversal position Zb toward the upper reversal position Za is referred to as the forward movement (forward direction). Movement (direction) of the wiper blades 6b from the upper reversal position Za toward the lower reversal position Zb is referred to as the backward movement (backward direction).

The vehicle wipers 6 each include a forward nozzle 7 and a backward nozzle 8, each corresponding to a washer nozzle that ejects a fed washer fluid toward the front window 1. The forward nozzle 7 is capable of ejecting the washer fluid toward the front window 1 in the forward direction of the vehicle wipers 6. The backward nozzle 8 is capable of ejecting the washer fluid toward the front window 1 in the backward direction of the vehicle wipers 6. In the present embodiment, the forward nozzle 7 and the backward nozzle 8 are arranged on the wiper arm 6a so that the backward nozzle 8 is located closer to the basal side (first and second pivot shafts P1 and P2) than the forward nozzle 7. The arrangement of the forward nozzle 7 and the backward nozzle 8 is not limited to the wiper arm 6a. For example, the forward nozzle 7 and the backward nozzle 8 may be arranged on the wiper blade 6b. Alternatively, when the forward nozzle 7 is arranged on one of the wiper arm 6a and the wiper blade 6b, the backward nozzle 8 may be arranged on the other one of the wiper arm 6a and the wiper blade 6b.

The vehicle cleaning system 100 further includes a washer pump 9 configured to feed the washer fluid to the forward nozzle 7 and the backward nozzle 8. More specifically, the washer pump 9 is fixed to a washer tank T and connected to the forward nozzle 7 and the backward nozzle 8 via a hose H. The washer pump 9 includes, for example, a pump motor and is configured to selectively feed the washer fluid to one of the forward nozzle 7 and the backward nozzle 8 by forwardly and reversely rotating the pump motor. In FIG. 1, the hose H is schematically indicated by a single line. The washer pump 9 is electrically connected to the controller 4 via the washer drive circuit 10 and controlled by the controller 4 so that the washer fluid is fed to one of the forward nozzle 7 and the backward nozzle 8.

The controller 4 is electrically connected to various kinds of devices and various kinds of switches via a vehicle ECU 11. More specifically, the controller 4 of the present embodiment is electrically connected to, for example, an ambient temperature sensor 12, an on-board camera CA, a vehicle speed sensor 13, a display 14, a wiper switch 15, and a washer switch 16 via the vehicle ECU 11.

The controller 4 includes the microcomputer 4a that performs various kinds of calculations and the memory 4b that stores various kinds of data and controls the wiper motor 2 and the washer pump 9 based on signals from the various kinds of devices and switches.

More specifically, for example, the controller 4 drives the wiper motor 2 when the wiper switch 15 is operated. The controller 4 drives the washer pump 9 and the wiper motor 2 when the washer switch 16 is operated.

In the present embodiment, when driving the wiper motor 2, the controller 4 determines whether or not the vehicle wipers 6 are in the constrained state caused by accumulated snow. The controller 4 drives the washer pump 9 so that the washer fluid is ejected in a direction in which the accumulated snow is present based on determination that the vehicle wipers 6 are in the constrained state caused by accumulated snow.

More specifically, the determination condition that the controller 4 determines that the vehicle wipers 6 are in the constrained state caused by accumulated snow includes the ambient temperature measured by the ambient temperature sensor 12 being less than or equal to a predetermined value K (e.g., 4° C.). The predetermined value K refers to a temperature at which snow accumulation may occur and is set to, for example, the highest temperature at which snow accumulation may occur.

The determination condition that the controller 4 determines that the vehicle wipers 6 are in the constrained state caused by accumulated snow further includes the vehicle wipers 6 being located in ranges α and β (cross-hatching in FIG. 1) from a (normal) reversal position to a predetermined position excluding the reversal position. More specifically, in the present embodiment, the determination condition that the controller 4 determines that the vehicle wipers 6 are in the constrained state caused by accumulated snow includes the wiper blade 6b of the vehicle wiper 6 being located in the range α from the upper reversal position Za to a predetermined position excluding the upper reversal position Za or the wiper blade 6b of the vehicle wiper 6 being located in the range β from the lower reversal position Zb (or rest position Zc) to a predetermined position excluding the lower reversal position Zb (or rest position Zc). In the present embodiment, the range β, which has a tendency to accumulate a large amount of snow, is set to be greater than the range α. The controller 4 is configured to obtain the position of the vehicle wipers 6 (wiper blades 6b) from the rotation information signal X and determines whether or not the vehicle wipers 6 are in the constrained state based on the rotation information signal X.

The controller 4 reversely drives the wiper motor 2 when the vehicle wipers 6 are in the constrained state. In the present embodiment, when the vehicle wipers 6 are in the constrained state, the controller 4 reversely drives the wiper motor 2 at a time when the vehicle wipers 6 are assumed to be unconstrained and pass in the opposite direction during a normal reciprocal operation. For example, when the vehicle wipers 6 are in the constrained state at a position Y in a forward operation, the wiper motor 2 is reversely driven at the time when the vehicle wipers 6 are assumed to be unconstrained and pass via the upper reversal position Za through the position Y in a backward operation.

The determination condition that the controller 4 determines that the vehicle wipers 6 are in the constrained state caused by accumulated snow includes the vehicle wipers 6 consecutively becoming constrained a predetermined number of times (three times in the present embodiment) as the vehicle wipers 6 are driven in the same direction. More specifically, when the vehicle wipers 6 are in the constrained state, the controller 4 reversely drives the wiper motor 2. Unless the vehicle wipers 6 become consecutively constrained the predetermined number of times (three times in the present embodiment) as the vehicle wipers 6 are driven in the same direction, the controller 4 determines that the vehicle wipers 6 are not in the constrained state caused by accumulated snow.

When it is determined that the vehicle wipers 6 are in the constrained state caused by accumulated snow, the controller 4 drives the washer pump 9 so that the washer fluid is ejected in a direction in which the accumulated snow is present in the constrained state. When the vehicle wipers 6 move forward and enter the constrained state, the direction in which the accumulated snow is present extends from the vehicle wipers 6 toward the upper reversal position Za. When the vehicle wipers 6 move reversely and enter the constrained state, the direction in which the accumulated snow is present extends from the vehicle wipers 6 toward the lower reversal position Zb. When the washer fluid is ejected based on determination that the vehicle wipers 6 are in the constrained state caused by accumulated snow, the controller 4 stops the washer pump 9 at time when the vehicle wipers 6 are assumed to be unconstrained and pass in the opposite direction during a normal reciprocal operation, that is, time when the wiper motor 2 is reversely driven as described above.

The operation and effects of the vehicle cleaning system 100 of the first embodiment will now be described.

Figure 2:
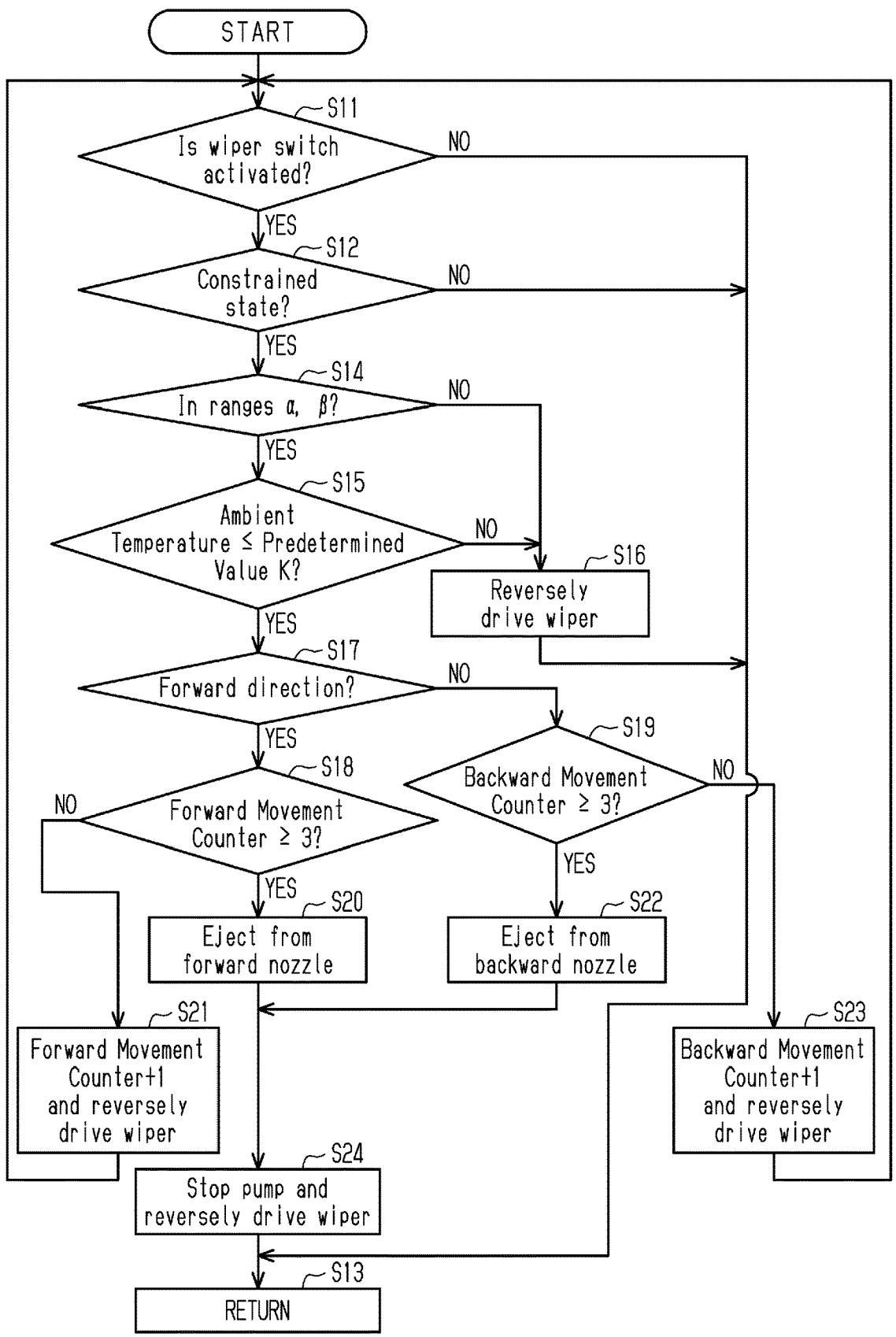
FIG. 2 is a flowchart showing a process executed by the controller in the first embodiment.

As shown in FIG. 2, in step S11, the controller 4 determines whether or not a command signal corresponding to an activation operation of the wiper switch 15 is input. If it is determined that the command signal is input, the controller 4 proceeds to step S12. If it is determined that the command signal is not input, the controller 4 proceeds to step S13 (RETURN) and returns to the start. When the command signal is input, the controller 4 drives the wiper motor 2 in another flow.

In step S12, the controller 4 determines whether or not the vehicle wipers 6 are in the constrained state based on the rotation information signal X. If it is determined that the vehicle wipers 6 are in the constrained state, the controller 4 proceeds to step S14. The position of the vehicle wipers 6 are obtained from the rotation information signal X as shown in FIG. 3. When the vehicle wipers 6 do not reach the upper reversal position Za or the lower reversal position Zb (or rest position Zc), it is determined that the vehicle wipers 6 are in the constrained state (constrained state flag is set to one). If it is determined that the vehicle wipers 6 are not in the constrained state, the controller 4 proceeds to step S13 (RETURN) and returns to the start.

In step S14, the controller 4 determines whether or not the vehicle wipers 6 are in the constrained state and located in the predetermined ranges α and β from the reversal positions excluding the reversal positions. If it is determined that the vehicle wipers 6 are located in the ranges α and β, the controller 4 proceeds to step S15. If it is determined that the vehicle wipers 6 are in the constrained state and are not located in the ranges α and β, the controller 4 proceeds to step S16 and reversely drives the wiper motor 2 and then proceeds to step S13 (RETURN) and returns to the start.

In step S15, the controller 4 determines whether or not the ambient temperature detected by the ambient temperature sensor 12 is less than or equal to the predetermined value K. If it is determined that the ambient temperature is less than or equal to the predetermined value K, the controller 4 proceeds to step S17. If it is determined that the ambient temperature is not less than or equal to the predetermined value K, the controller 4 proceeds to step S16 and reversely drives the wiper motor 2 and then proceeds to step S13 (RETURN) and returns to the start.

Figure 3:
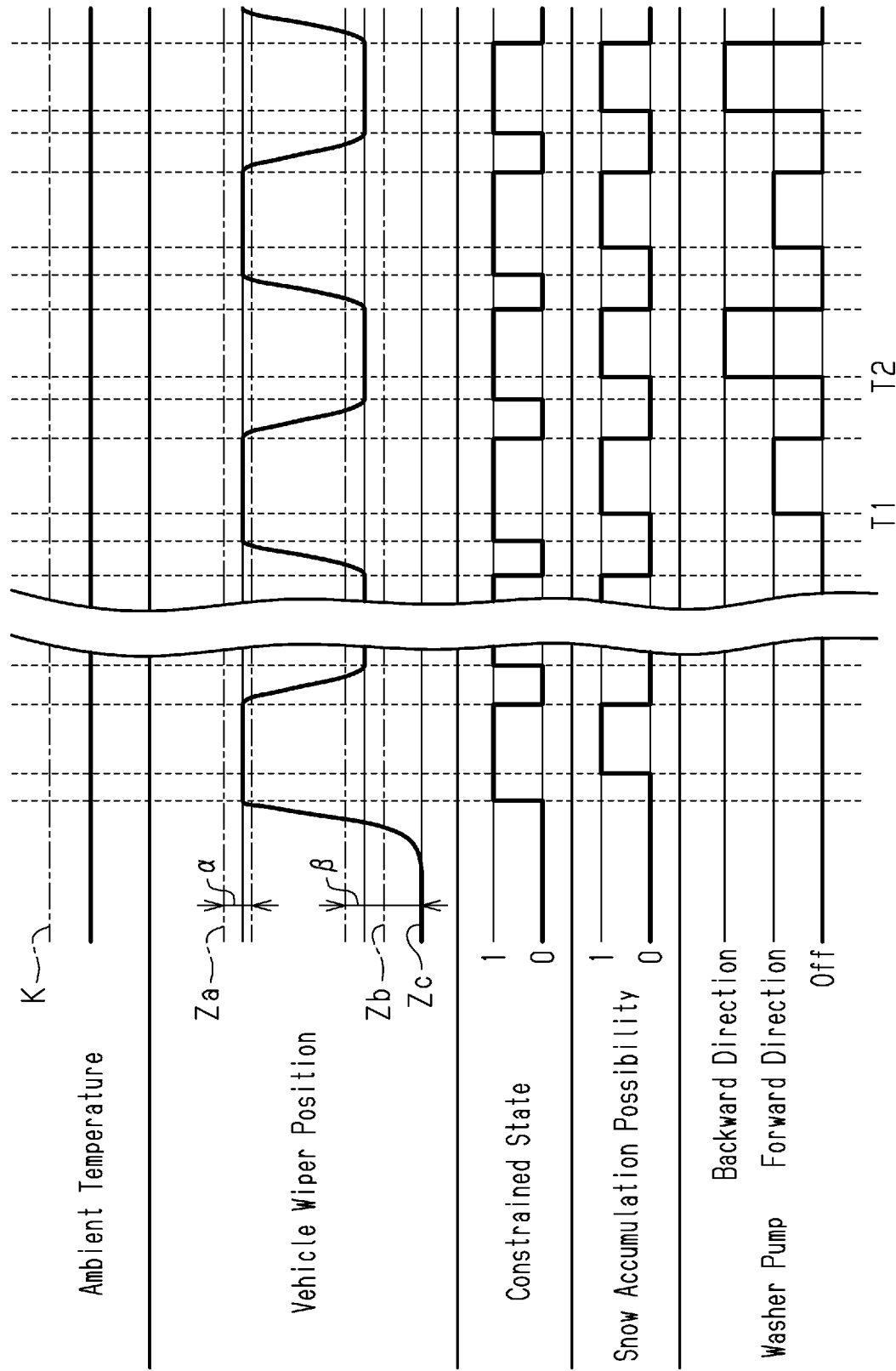
FIG. 3 is a waveform diagram showing operation of the vehicle cleaning system in the first embodiment.

As shown in FIG. 3, in the present embodiment, when proceeding to step S17 via steps S11, S12, S14, and S15, the controller 4 sets a snow accumulation possibility flag to one. When the wiper motor 2 is reversely driven next time, the controller 4 sets the snow accumulation possibility flag to zero.

In step S17, the controller 4 determines whether or not the driving direction of the vehicle wipers 6 is the forward direction. If it is determined that the driving direction is the forward direction, the controller 4 proceeds to step S18. If it is determined that the driving direction is not the forward direction (thus is the backward direction), the controller 4 proceeds to step S19.

In steps S18 and S19, the controller 4 determines whether or not the vehicle wipers 6 consecutively become constrained the predetermined number of times (three times in the present embodiment) as the vehicle wipers 6 are driven in the same direction. More specifically, in step S18, the controller 4 determines whether or not a forward movement counter, which is a record indicating how many times the vehicle wipers 6 consecutively become constrained while moving forward, is greater than or equal to three. If the forward movement counter is greater than or equal to three, the controller 4 proceeds to step S20. If not, the controller 4 proceeds to step S21. In step S19, the controller 4 determines whether or not a backward movement counter, which is a record indicating how many times the vehicle wipers 6 consecutively become constrained while moving backward, is greater than or equal to three. If the backward movement counter is greater than or equal to three, the controller 4 proceeds to step S22. If not, the controller 4 proceeds to step S23.

In step S21, the controller 4 adds one to (increments) the forward movement counter and reversely drives the wiper motor 2 and proceeds to step S11. In step S23, the controller 4 adds one to (increments) the backward movement counter and reversely drives the wiper motor 2 and proceeds to step S11.

When proceeding to step S20, it is determined that the vehicle wipers 6 are in the constrained state caused by accumulated snow (in the forward direction). In step S20, the controller 4 drives the washer pump 9 so that the washer fluid is ejected in the forward direction, or the direction in which the accumulated snow is present, that is, so that the washer fluid is fed to the forward nozzle 7, and proceeds to step S24. In the present embodiment, as shown in FIG. 3, in step S20, when the snow accumulation possibility flag rises three times corresponding to the forward direction (refer to time T1), the controller 4 drives the washer pump 9 ("in forward direction" in FIG. 3) so that the washer fluid is fed to the forward nozzle 7. As a result, the washer fluid is ejected from the forward nozzle 7 in the forward direction, or the direction in which the accumulated snow is present.

When proceeding to step S22, it is determined that the vehicle wipers 6 are in the constrained state caused by accumulated snow (in the backward direction). In step S22, the controller 4 drives the washer pump 9 so that the washer fluid is ejected in the backward direction, or the direction in which the accumulated snow is present, that is, so that the washer fluid is fed to the backward nozzle 8, and proceeds to step S24. In the present embodiment, as shown in FIG. 3, in step S22, when the snow accumulation possibility flag rises three times corresponding to the forward direction (refer to time T2), the controller 4 drives the washer pump 9 ("in backward direction" in FIG. 3) so that the washer fluid is fed to the backward nozzle 8. As a result, the washer fluid is ejected from the backward nozzle 8 in the backward direction, or the direction in which the accumulated snow is present.

Next, in step S24, the controller 4 stops the washer pump 9 and reversely drives the wiper motor 2 and then proceeds to step S13 (RETURN) and returns to the start. In step S24, the controller 4 stops the washer pump 9 at time when the vehicle wipers 6 are assumed to be unconstrained and pass in the opposite direction during a normal reciprocal operation.

The first embodiment has the advantages described below.

(1) The controller 4 drives the washer pump 9 so that the washer fluid is ejected in a direction in which the accumulated snow is present based on determination that the vehicle wipers 6 are in the constrained state caused by accumulated snow. Thus, the washer fluid is effectively used to melt accumulated snow. This efficiently removes the accumulated snow. More specifically, it is highly probable that the washer fluid and the vehicle wipers 6 readily remove the accumulated snow, for example, without the driver going outside the passenger compartment.

(2) The washer nozzles include the forward nozzle 7, which is capable of ejecting the washer fluid in the forward direction of the vehicle wipers 6, and the backward nozzle 8, which is capable of ejecting the washer fluid in the backward direction of the vehicle wipers 6. Thus, when the accumulated snow is present in the forward direction of the vehicle wipers 6 and when the accumulated snow is present in the backward direction of the vehicle wipers 6, the accumulated snow is efficiently removed.

(3) The determination condition that the controller 4 determines that the vehicle wipers 6 are in the constrained state caused by accumulated snow includes the ambient temperature being less than or equal to the predetermined value K. This limits erroneous determination of the constrained state caused by accumulated snow when the constrained state is not caused by accumulated snow. As a result, for example, unnecessary consumption of the washer fluid is reduced.

(4) The determination condition that the controller 4 determines that the vehicle wipers 6 are in the constrained state caused by accumulated snow includes the vehicle wipers 6 being located in the ranges α and β from the reversal positions to the predetermined positions excluding the reversal positions. This limits erroneous determination that the constrained state is caused by accumulated snow when the constrained state is not caused by accumulated snow. As a result, for example, unnecessary consumption of the washer fluid is reduced.

(5) The determination condition that the controller 4 determines that the vehicle wipers 6 are in the constrained state caused by accumulated snow includes the vehicle wipers 6 consecutively becoming constrained a predetermined number of times (three times in the present embodiment) as the vehicle wipers 6 are driven in the same direction. Thus, when the vehicle wipers 6 contact accumulated snow and wipe away the accumulated snow before reaching the predetermined number of times, the washer fluid will not be consumed. When the vehicle wipers 6 contact accumulated snow the predetermined number of times but do not wipe away the accumulated snow, the washer fluid is ejected in a direction in which the accumulated snow is present and efficiently removes the accumulated snow.

Second Embodiment

A second embodiment of a vehicle cleaning system 100 will now be described with reference to FIGS. 4 and 5. The present embodiment differs from the first embodiment only in one or more of the controls performed by the controller 4. Thus, the same reference characters are given to those components and controls (steps) that are the same as the corresponding components and controls (steps) of the first embodiment. The description will focus on the differences from the first embodiment.

In the present embodiment, based on determination that the vehicle wipers 6 are in the constrained state caused by accumulated snow and determination that the vehicle is at a standstill based on a value of the vehicle speed sensor 13, the controller 4 drives the washer pump 9 so that the washer fluid is ejected in a direction in which the accumulated snow is present.

Additionally, in the present embodiment, the controller 4 drives the washer pump 9 in accordance with predetermined setting (e.g., number of times or amount of time, in the present embodiment, three times) based on determination that the vehicle wipers 6 are in the constrained state caused by accumulated snow. Subsequently, if it is determined that the vehicle wipers 6 are not released from the constrained state caused by accumulated snow, the controller 4 stops (does not drive) the washer pump 9. Additionally, when it is determined that the vehicle wipers 6 are not released from the constrained state caused by accumulated snow as described above, the controller 4 issues an notification indicating the state through a notification unit, for example, the display 14 in addition to stopping the washer pump 9.

In the first embodiment, the determination condition that the controller 4 determines the constrained state caused by accumulated snow includes the vehicle wipers 6 consecutively becoming constrained a predetermined number of times (three times in the first embodiment) as the vehicle wipers 6 are driven in the same direction. However, in the present embodiment, the controller 4 does not include this determination condition.

Figure 4:
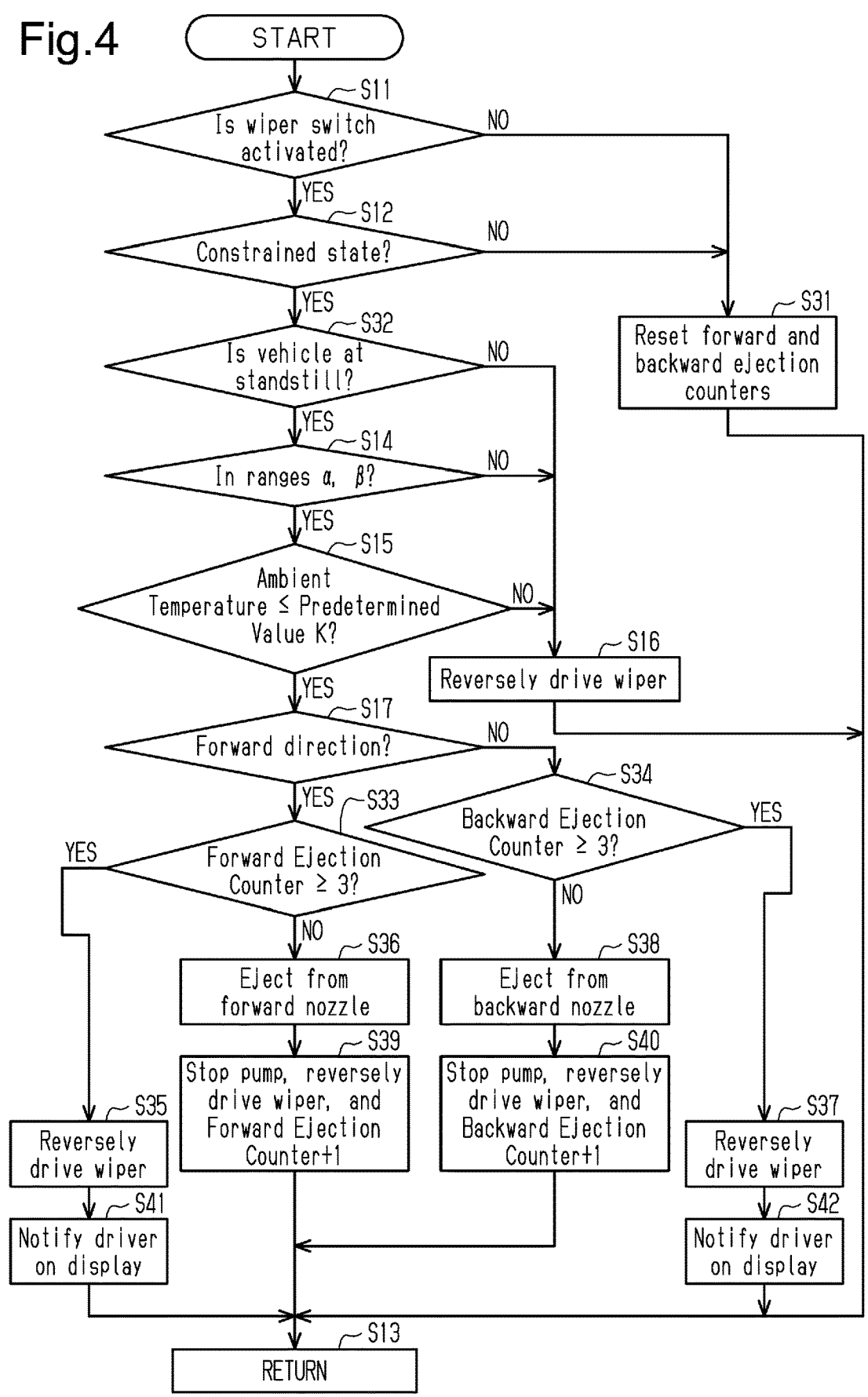
FIG. 4 is a flowchart showing a process executed by the controller in a second embodiment.
Figure 5:
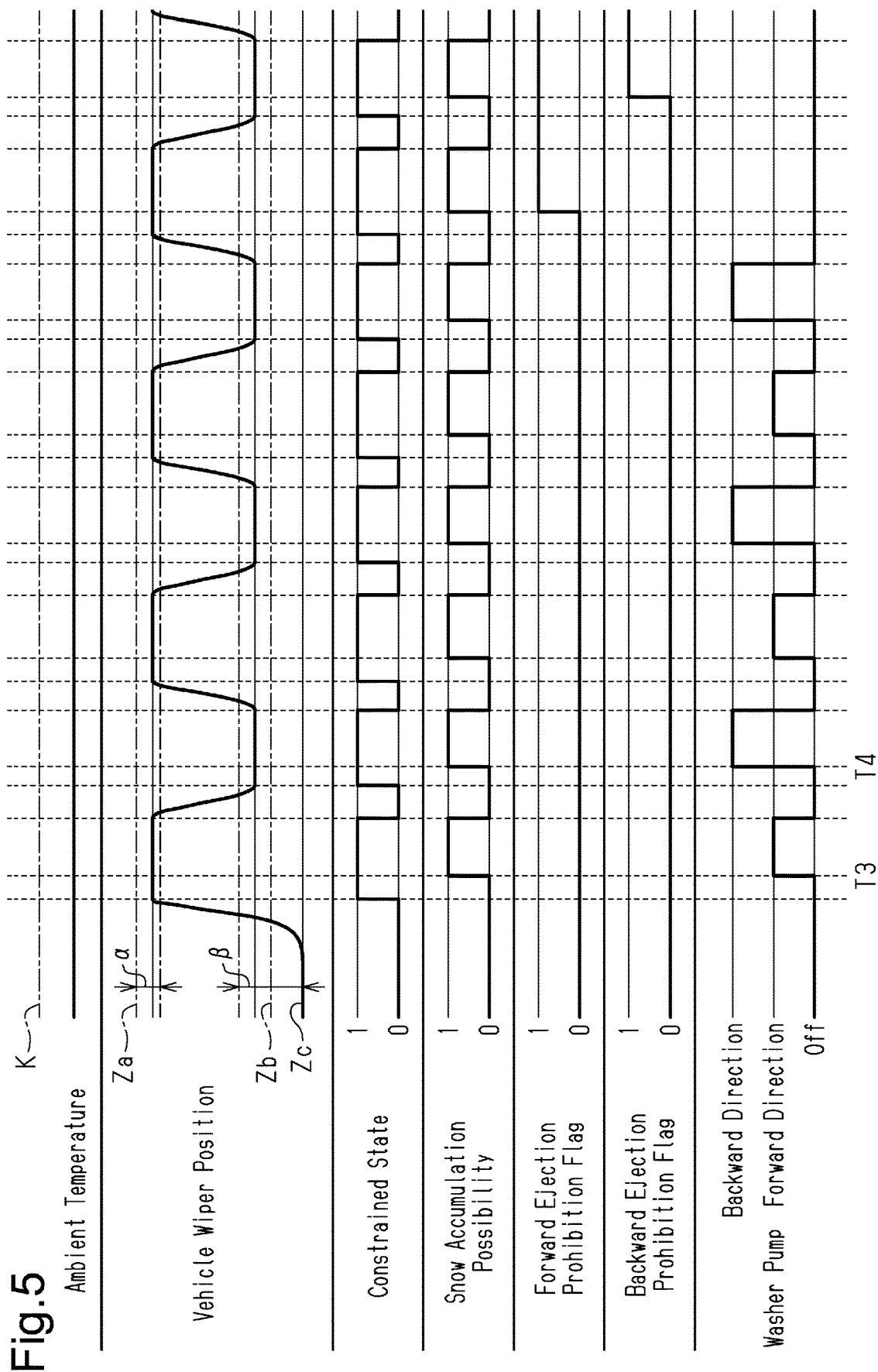
FIG. 5 is a waveform diagram showing operation of the vehicle cleaning system in the second embodiment.

More specifically, as shown in FIG. 4, in step S11, the controller 4 of the present embodiment determines whether or not a command signal corresponding to an activation operation of the wiper switch 15 is input. If it is determined that the command signal is not input, the controller 4 proceeds to step S31.

In step S31, the controller 4 resets a forward ejection counter and a backward ejection counter (that is, sets values to zero), which will be described later, and proceeds to step S13.

In step S12, the controller 4 determines whether or not the vehicle wipers 6 are in the constrained state based on the rotation information signal X. If it is determined that the vehicle wipers 6 are in the constrained state, the controller 4 proceeds to step S32. If it is determined that the vehicle wipers 6 are not in the constrained state, the controller 4 proceeds to step S31.

In step S32, the controller 4 determines whether or not the vehicle is at a standstill based on a value of the vehicle speed sensor 13. If it is determined that the vehicle is at a standstill, the controller 4 proceeds to step S14. If it is determined that the vehicle is not at a standstill, the controller 4 proceeds to step S16.

In step S17, the controller 4 determines whether or not the driving direction of the vehicle wipers 6 is the forward direction. If it is determined that the driving direction is the forward direction, the controller 4 proceeds to step S33. If it is determined that the driving direction is not the forward direction (thus is the backward direction), the controller 4 proceeds to step S34.

In steps S33 and S34, the controller 4 determines whether or not the vehicle wipers 6 consecutively eject the washer fluid a predetermined number of times (three times in the present embodiment) as the vehicle wipers 6 are driven in the same direction. More specifically, in step S33, the controller 4 determines whether or not the forward ejection counter, which is a record indicating how many times the washer fluid is consecutively ejected from the forward nozzle 7 when the vehicle wipers 6 move forward, is greater than or equal to three. If the forward ejection counter is greater than or equal to three, the controller 4 proceeds to step S35. If not, the controller 4 proceeds to step S36. In step S34, the controller 4 determines whether or not the backward ejection counter, which is a record indicating how many times the washer fluid is consecutively ejected from the backward nozzle 8 when the vehicle wipers 6 move backward, is greater than or equal to three. If the backward ejection counter is greater than or equal to three, the controller 4 proceeds to step S37. If not, the controller 4 proceeds to step S38. In the present embodiment, in step S33, if the forward ejection counter is greater than or equal to three, a forward ejection prohibition flag is set to one to control the washer pump 9 so that the washer fluid will not be ejected from the forward nozzle 7 in the state (refer to FIG. 5). Additionally, in the present embodiment, in step S34, if the backward ejection counter is greater than or equal to three, a backward ejection prohibition flag is set to one to control the washer pump 9 so that the washer fluid will not be ejected from the backward nozzle 8 in the state (refer to FIG. 5).

In step S36, the controller 4 drives the washer pump 9 so that the washer fluid is ejected in the forward direction, or the direction in which the accumulated snow is present, that is, so that the washer fluid is fed to the forward nozzle 7, and proceeds to step S39. In the present embodiment, as shown in FIG. 5, in step S36, when the snow accumulation possibility flag rises one time corresponding to the forward direction (refer to time T3), the controller 4 drives the washer pump 9 ("in forward direction" in FIG. 5) so that the washer fluid is fed to the forward nozzle 7. As a result, the washer fluid is ejected from the forward nozzle 7 in the forward direction, or the direction in which the accumulated snow is present.

In step S39, the controller 4 stops the washer pump 9 and reversely drives the wiper motor 2, adds one to (increments) the forward ejection counter, and then proceeds to step S13 (RETURN) and returns to the start.

In step S38, the controller 4 drives the washer pump 9 so that the washer fluid is ejected in the backward direction, or the direction in which the accumulated snow is present, that is, so that the washer fluid is fed to the backward nozzle 8, and proceeds to step S40. In the present embodiment, as shown in FIG. 5, in step S38, when the snow accumulation possibility flag rises one time corresponding to the backward direction (refer to time T4), the controller 4 drives the washer pump 9 ("in backward direction" in FIG. 5) so that the washer fluid is fed to the backward nozzle 8. As a result, the washer fluid is ejected from the backward nozzle 8 in the backward direction, or the direction in which the accumulated snow is present.

In step S40, the controller 4 stops the washer pump 9 and reversely drives the wiper motor 2, adds one to (increments) the backward ejection counter, and then proceeds to step S13 (RETURN) and returns to the start.

In step S35, the controller 4 reversely (backwardly) drives the wiper motor 2 and proceeds to step S41.

In step S37, the controller 4 reversely (backwardly) drives the wiper motor 2 and proceeds to step S42.

In steps S41 and S42, the controller 4 shows information indicating that the vehicle wipers 6 are not released from the constrained state caused by accumulated snow on the display 14 to notify the information to the driver and proceeds to step S13 (RETURN) and returns to the start.

The second embodiment has the advantages described below other than the advantages of the first embodiment.

(1) Based on determination that the vehicle wipers 6 are in the constrained state caused by accumulated snow and determination that the vehicle is at a standstill based on a value of the vehicle speed sensor 13, the controller 4 drives the washer pump 9 so that the washer fluid is ejected in a direction in which the accumulated snow is present. This avoids ejection of the washer fluid during traveling. Thus, ejection of the washer fluid is prevented, for example, regardless of the presence of a pedestrian or another vehicle close to the traveling road. This prevents ejection of the washer fluid to a pedestrian or another vehicle.

(2) The controller 4 drives the washer pump 9 in accordance with the predetermined setting (e.g., number of times or amount of time) based on determination that the vehicle wipers 6 are in the constrained state caused by accumulated snow. Subsequently, if it is determined that the vehicle wipers 6 are not released from the constrained state caused by accumulated snow, the controller 4 stops (does not drive) the washer pump 9. This avoids a situation in which the washer fluid is continuously consumed and wasted for accumulated snow that cannot be removed by ejection of the washer fluid.

(3) When it is determined that the vehicle wipers 6 are not released from the constrained state caused by accumulated snow as described above, the controller 4 issues an notification indicating the state through a notification unit, for example, the display 14 in addition to stopping the washer pump 9. Thus, the driver is informed that the accumulated snow may not be removed by ejection of the washer fluid. The notification unit is not limited to the display 14 and may be, for example, a speaker issuing a sound notification or a vibration source vibrating a seat or a steering wheel.

(4) The determination condition that the controller 4 determines that the vehicle wipers 6 are in the constrained state caused by accumulated snow does not include the vehicle wipers 6 consecutively becoming constrained a predetermined number of times (three times in the first embodiment) as the vehicle wipers 6 are driven in the same direction. As a result, the washer fluid is ejected in a direction in which the accumulated snow is present at an earlier stage than the first embodiment. Thus, the accumulated snow may be resolved at an early stage. In the embodiment, the predetermined number of times may be changed to a number of times other than three times.

The above-described embodiments may be modified as follows.

In the embodiments, when it is determined that the vehicle wipers 6 are in the constrained state caused by accumulated snow, the controller 4 may subsequently drive the washer pump 9 as the vehicle wipers 6 approach the position in which the vehicle wipers 6 were constrained.

Figure 6:
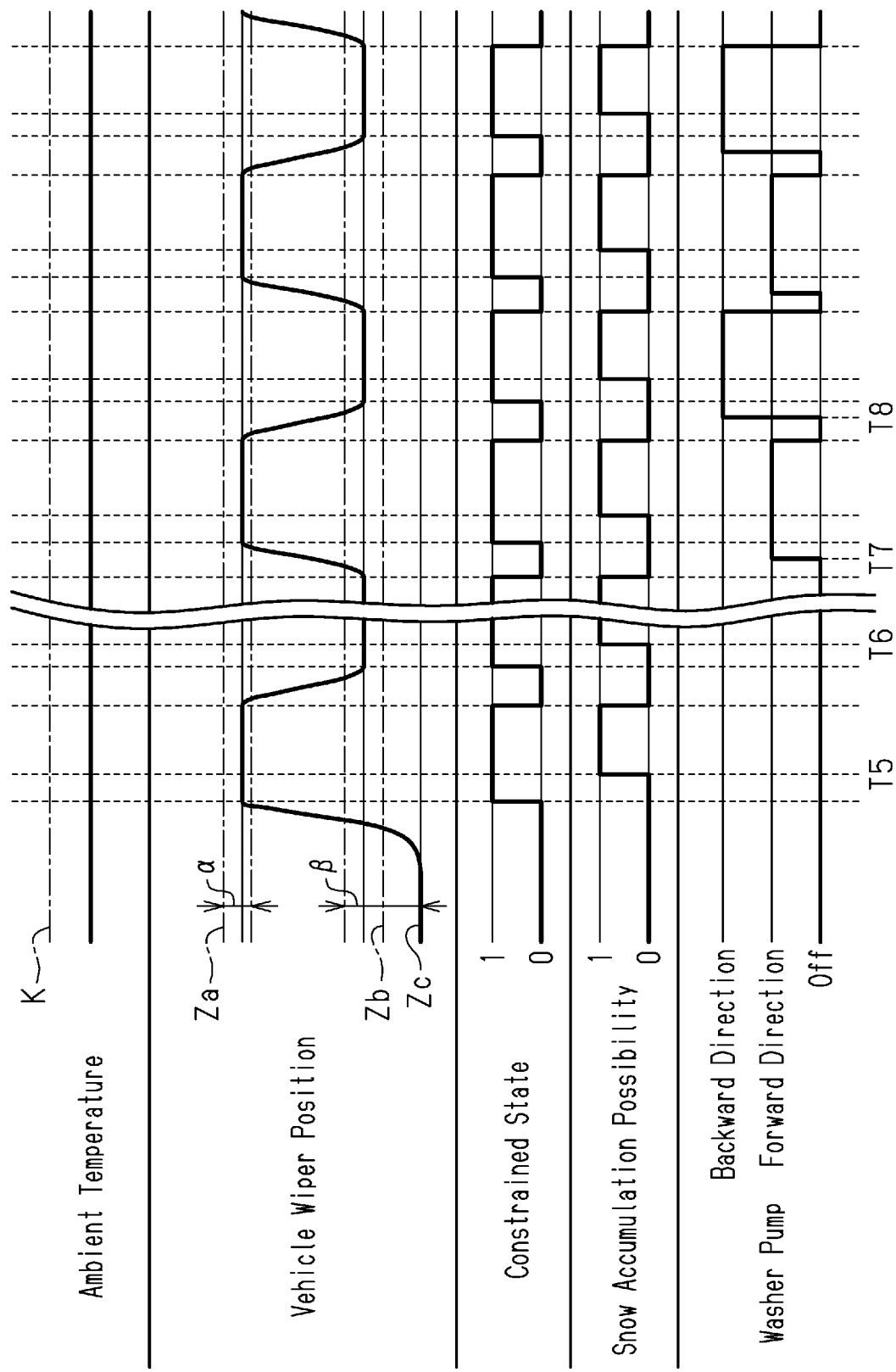
FIG. 6 is a waveform diagram showing operation of the vehicle cleaning system in a modified example.

In this configuration, for example, as shown in FIG. 6, when it is determined that the vehicle wipers 6 are in the constrained state caused by accumulated snow (refer to times T5 and T6), the washer pump 9 is subsequently driven as the vehicle wipers 6 approach the position in which the vehicle wipers 6 were constrained (refer to times T7 and T8). Thus, the washer fluid is ejected to a wider range of the accumulated snow than, for example, when the washer fluid is ejected only at the position in which the vehicle wipers 6 were constrained. This further efficiently removes the accumulated snow.

In the embodiments, the vehicle wipers 6 include the forward nozzle 7, which is capable of ejecting the washer fluid in the forward direction of the vehicle wipers 6, and the backward nozzle 8, which is capable of ejecting the washer fluid in the backward direction of the vehicle wipers 6. Instead, for example, only one of the forward nozzle 7 and the backward nozzle 8 may be provided in the configuration. In this case, the washer fluid is ejected only when accumulated snow is present in a direction corresponding to the provided washer nozzle (forward nozzle 7 or backward nozzle 8).

In the embodiments, the determination condition that the controller 4 determines that the vehicle wipers 6 are in the constrained state caused by accumulated snow includes the ambient temperature being less than or equal to the predetermined value K. However, this determination condition may be excluded.

In the embodiments, the determination condition that the controller 4 determines that the vehicle wipers 6 are in the constrained state caused by accumulated snow further includes the wiper blades 6b of the vehicle wipers 6 being located in the ranges α and β from the reversal positions to the predetermined positions excluding the reversal positions. However, this determination condition may be excluded.

In the embodiments, the determination condition that the controller 4 determines the constrained state caused by accumulated snow may include other conditions and may include, for example, determination that accumulated snow is present based on information (e.g., luminance of an image) from an optical sensor such as the on-board camera CA.

In the embodiments, the controller 4 determines whether or not the constrained state is present based on the rotation information signal X from the rotation sensor A included in the wiper motor 2. Instead, whether or not the constrained state is present may be determined based on, for example, whether or not a value of current supplied to the wiper motor 2 exceeds a threshold value. Additionally, whether or not the constrained state is present may be determined based on whether or not the value of current supplied to the wiper motor 2 is increased for a predetermined amount of time.

In the embodiments, the output shaft 2a of the wiper motor 2 is drivingly coupled to the two vehicle wipers 6 via the link mechanism 5. Instead, for example, the output shaft 2a of the wiper motor 2 may be directly and drivingly coupled to the vehicle wipers 6 (more specifically, basal portions of wiper arms 6b) without using the link mechanism 5. In this case, the number of wiper motors needs to be the same as the number of vehicle wipers.

In the embodiments, the pump motor of the washer pump 9 is forwardly and reversely rotated so that the washer fluid is selectively fed to one of the forward nozzle 7 and the backward nozzle 8. However, there is no limit to such a configuration. For example, two washer pumps each including a pump motor that rotates in a single direction may be provided. When one of the washer pumps is driven to rotate, the washer fluid is fed to one of the forward nozzle 7 and the backward nozzle 8. When the other washer pump is driven to rotate, the washer fluid is fed to the other one of the forward nozzle 7 and the backward nozzle 8. In this case, when the two washer pumps are simultaneously driven to rotate, the washer fluid may be simultaneously fed to the forward nozzle 7 and the backward nozzle 8.

In the embodiments, it is determined that the vehicle is at a standstill based on a value of the vehicle speed sensor 13. However, there is no limit to such a configuration. For example, it may be determined that the vehicle is at a standstill based on the shifter of the vehicle being set to the position for parking "P." Alternatively, it may be determined that the vehicle is at a standstill based on the value of the vehicle speed sensor 13 and the shifter of the vehicle being set to the position for parking "P." Further, the above determination conditions may be combined with the parking brake being applied.

The controller 4 is not limited to a device that includes a central processing unit and a memory and executes all the above-described processes through software. For example, the controller 4 may include dedicated hardware (an application specific integrated circuit: ASIC) that executes at least part of the various processes. More specifically, the controller 4 may be circuitry including 1) one or more dedicated hardware circuits such as an ASIC, 2) one or more processors (microcomputers) that operate according to a computer program (software), or 3) a combination of these.

Technical concepts obtained from the above embodiments and the modified examples will now be described.

(A) The determination condition for determining that the vehicle wipers are in the constrained state caused by accumulated snow includes determination that accumulated snow is present based on information from an optical sensor.

In this configuration, the determination condition for determining that the vehicle wipers are in the constrained state caused by accumulated snow includes determination that accumulated snow is present based on information (e.g., luminance of an image) from an optical sensor (e.g., on-board camera). This limits erroneous determination of the constrained state caused by accumulated snow when accumulated snow is not present.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle cleaning system, comprising:
   a wiper motor that forwardly and reversely rotates an output shaft;
   a vehicle wiper that is coupled to the output shaft and reciprocally wipes a surface for wiping in accordance with forward and reverse rotations of the output shaft;
   a washer nozzle arranged on the vehicle wiper;
   a washer pump that feeds a washer fluid to the washer nozzle; and
   a controller that controls the wiper motor and the washer pump, wherein
   the controller drives the washer pump so that the washer fluid is ejected in a direction in which accumulated snow is present based on a determination that, when the washer pump is not driven, the vehicle wiper is in a constrained state caused by accumulated snow.

2. The vehicle cleaning system according to claim 1, wherein the washer nozzle is at least one of a forward nozzle or a backward nozzle, the forward nozzle is capable of ejecting the washer fluid in a direction in which the vehicle wiper moves forward, and the backward nozzle is capable of ejecting the washer fluid in a direction in which the vehicle wiper moves backward.

3. The vehicle cleaning system according to claim 1, wherein a determination condition for determining that the vehicle wiper is in the constrained state includes an ambient temperature being less than or equal to a predetermined value.

4. The vehicle cleaning system according to claim 1, wherein a determination condition for determining that the vehicle wiper is in the constrained state includes the vehicle wiper being located in a range from a reversal position to a predetermined position excluding the reversal position.

5. The vehicle cleaning system according to claim 1, wherein the controller is configured to reversely drive the wiper motor when the vehicle wiper becomes constrained, and a determination condition for determining that the vehicle wiper is in the constrained state includes the vehicle wiper consecutively becoming constrained a predetermined number of times as the vehicle wiper is driven in the same direction.

6. The vehicle cleaning system according to claim 1, wherein the controller drives the washer pump based on a determination that the vehicle wiper is in the constrained state and a vehicle being at a standstill.

7. The vehicle cleaning system according to claim 1, wherein when it is determined that the vehicle wiper is in the constrained state, the controller subsequently drives the washer pump as the vehicle wiper approaches a position in which the vehicle wiper was constrained.

8. The vehicle cleaning system according to claim 1, wherein the controller drives the washer pump in accordance with predetermined setting based on determination that the vehicle wiper is in the constrained state, and when it is subsequently determined that the vehicle wiper is not released from the constrained state, the controller stops the washer pump.

9. The vehicle cleaning system according to claim 8, wherein when it is determined that the vehicle wiper is not released from the constrained state, the controller stops the washer pump and causes a notification unit to issue a notification.

* * * * *